(12) United States Patent
Ewing et al.

(10) Patent No.: US 10,800,526 B2
(45) Date of Patent: Oct. 13, 2020

(54) AIRCRAFT ADAPTER

(71) Applicant: Bell Helicopter Textron Inc., Fort Worth, TX (US)

(72) Inventors: Alan Carl Ewing, Keller, TX (US); Antonio Cardenas Munguia, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 273 days.

(21) Appl. No.: 15/591,705

(22) Filed: May 10, 2017

(65) Prior Publication Data
US 2018/0327094 A1    Nov. 15, 2018

(51) Int. Cl.
| | | |
|---|---|---|
| *B64D 7/00* | (2006.01) | |
| *B64D 7/06* | (2006.01) | |
| B64D 37/04 | (2006.01) | |
| B64D 37/12 | (2006.01) | |

(52) U.S. Cl.
CPC .......... *B64D 7/00* (2013.01); *B64D 7/06* (2013.01); *B64D 37/04* (2013.01); *B64D 37/12* (2013.01)

(58) Field of Classification Search
CPC ............................... B64D 37/04; B64D 7/00
USPC ........................... 244/118.1; 89/37.19
See application file for complete search history.

(56) References Cited

U.S. PATENT DOCUMENTS

| | | | | |
|---|---|---|---|---|
| 4,711,415 A | * | 12/1987 | Binden | B64C 27/325 244/17.19 |
| 5,187,318 A | * | 2/1993 | Sanderson | F41A 23/00 89/1.54 |
| 5,483,865 A | * | 1/1996 | Brunand | F41G 3/22 342/66 |
| 6,250,195 B1 | * | 6/2001 | Mendoza | B64D 7/08 244/137.4 |
| 7,624,947 B2 | * | 12/2009 | Dortch | B64D 7/04 244/118.1 |
| 7,950,607 B1 | * | 5/2011 | Dickerson | F41F 3/06 244/137.4 |
| 2005/0204910 A1 | * | 9/2005 | Padan | B64D 1/04 89/1.813 |
| 2006/0081733 A1 | * | 4/2006 | Lam | B64D 1/04 244/137.4 |
| 2010/0206992 A1 | * | 8/2010 | Woodland | B64C 1/1461 244/137.1 |
| 2010/0326264 A1 | * | 12/2010 | Roemerman | B64D 1/06 89/1.56 |

(Continued)

*Primary Examiner* — Claude J Brown
(74) *Attorney, Agent, or Firm* — Lightfoot & Alford PLLC

(57) ABSTRACT

An adapter is disclosed for use with an aircraft including wingtip stations defining mounting surfaces. The adapter is configured and dimensioned for connection to the wingtip stations on either wing of the aircraft to facilitate the connection of a weapons rack to the aircraft. The adapter includes a backing plate, and a body connected to the backing plate that is configured and dimensioned to support the weapons rack. The backing plate is configured and dimensioned in correspondence with the mounting surfaces defined by the wingtip stations. The body includes a base extending outwardly from the backing plate along a first axis, and a support member extending outwardly from the base along a second axis. In one particular embodiment of the adapter, the first and second axes define an angle of 45° therebetween.

19 Claims, 7 Drawing Sheets

(56) References Cited

U.S. PATENT DOCUMENTS

| | | | |
|---|---|---|---|
| 2015/0021436 A1* | 1/2015 | Hainsworth | B64D 1/02 244/118.1 |
| 2015/0296695 A1* | 10/2015 | Skjaeveland | A01B 15/06 172/772.5 |
| 2016/0288906 A1* | 10/2016 | Christof | B64D 1/08 |
| 2017/0211903 A1* | 7/2017 | Davison | B64D 7/02 |
| 2018/0045791 A1* | 2/2018 | Kalgren | G01R 31/40 |

* cited by examiner

AIRCRAFT ADAPTER

BACKGROUND

Technical Field

The present disclosure relates to an adapter that facilitates the interchange of munitions and auxiliary fuel tanks at the wingtip stations of military aircraft.

Background of the Related Art

Military aircraft often include a series of wing stations, located in underwing and wingtip positions, to carry weapons and auxiliary fuel tanks. Often times, the underwing stations are used to carry air-to-ground missile (AGM) systems and/or auxiliary fuel tanks, while the wingtip stations are used to carry air-to-air missile (AAM) systems.

Given their relative positions and orientations on the wings of the aircraft, the underwing stations generally include horizontal mounting surfaces, whereas the wingtip stations generally include vertical mounting surfaces. Consequently, the configurations of the racks used to mount munitions in the underwing and wingtip stations are dissimilar, which creates challenges with munitions capability, e.g., due to spacing requirements between adjacent stations, limiting variation in the setup and location of the munitions systems. As such, there remains a need for an adapter that increases clearance between adjacent weapons station, and extends the weapons capability of aircraft by allowing for variation in the location of different weapons systems.

Figure 2:
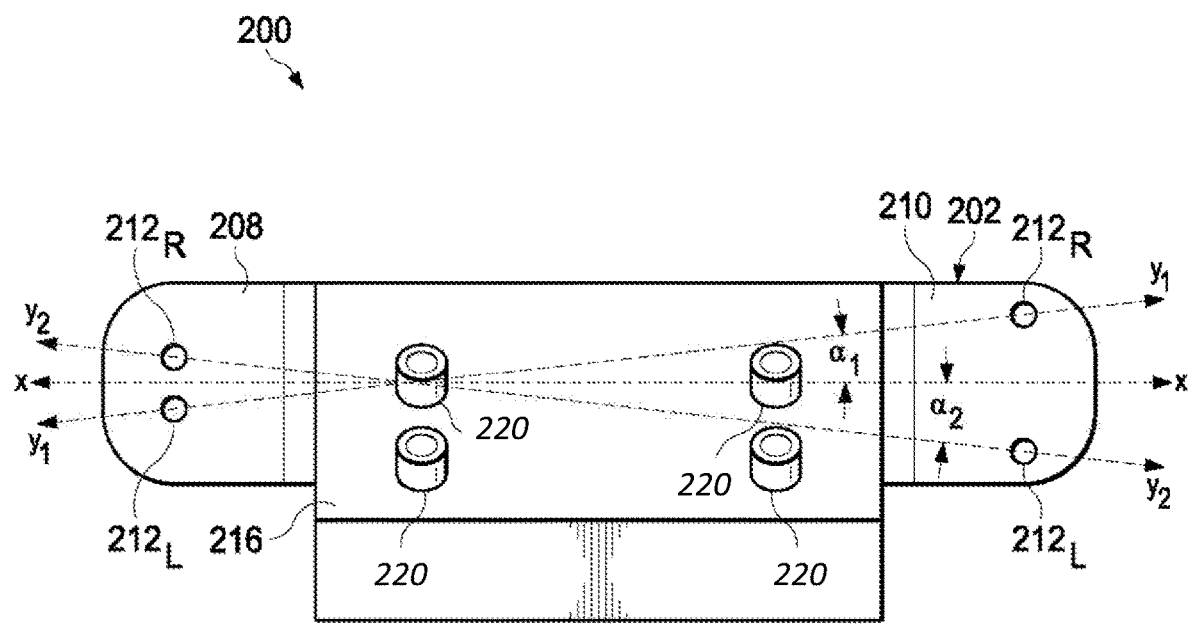
FIG. 2 is a front view of an adapter for use with the aircraft seen in FIG. 1 to facilitate the connection of weapons racks to wings of the aircraft.
Figure 3:
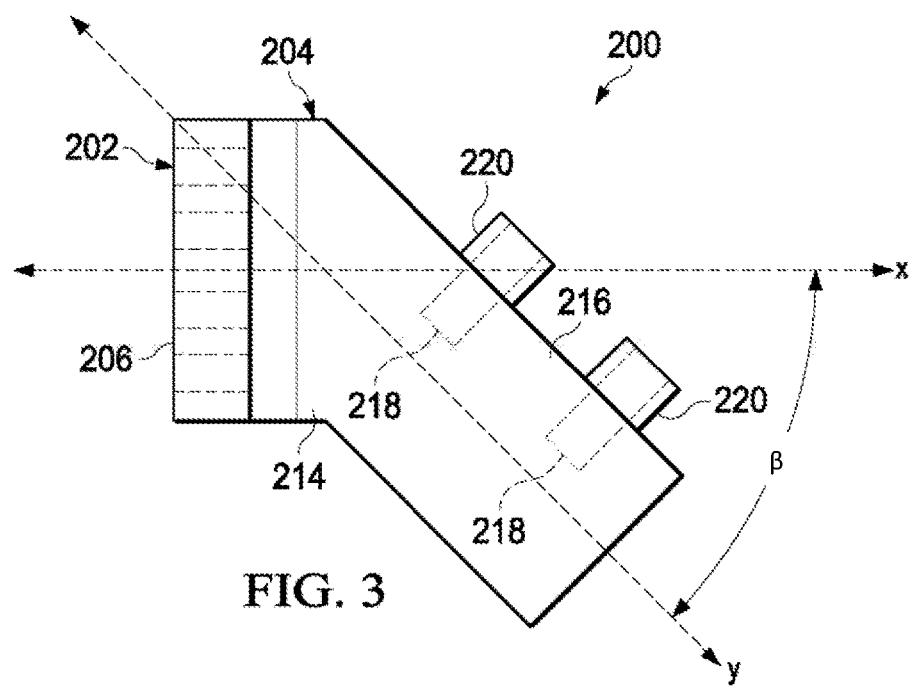
FIG. 3 is a side view of the adapter shown in FIG. 2.
Figure 7:
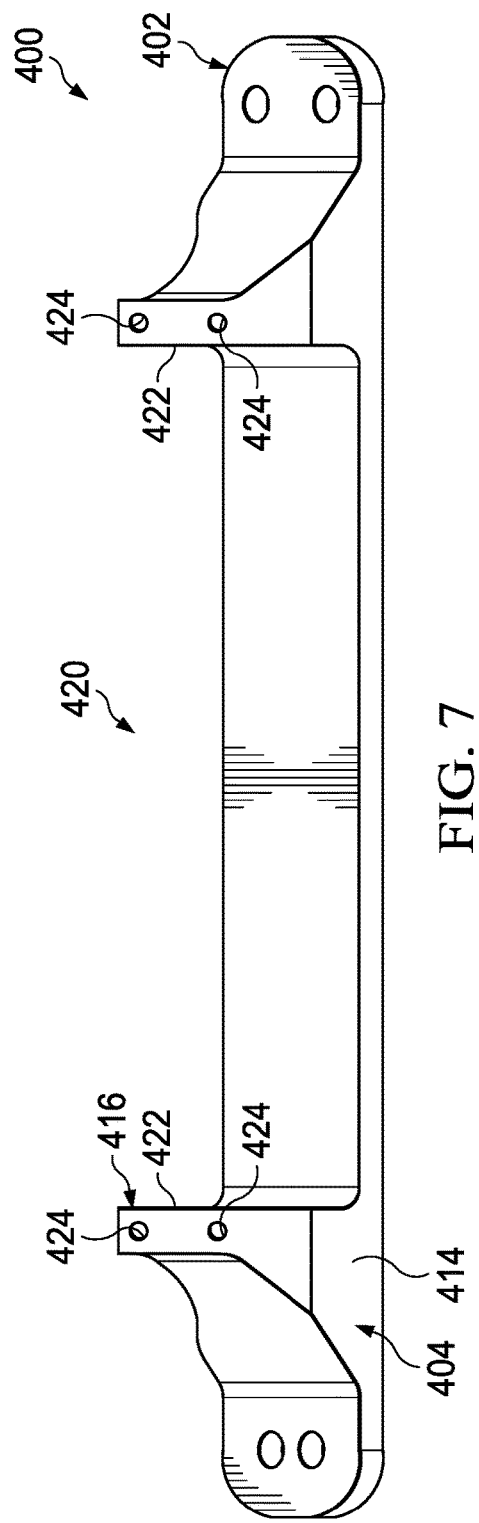
Figure 8:
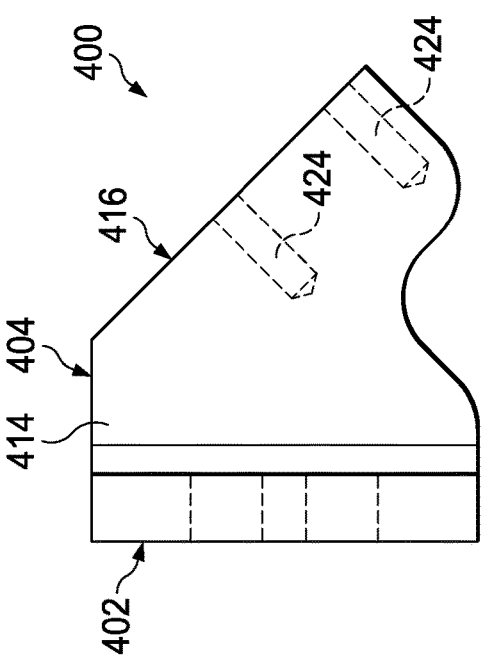
Figure 9:
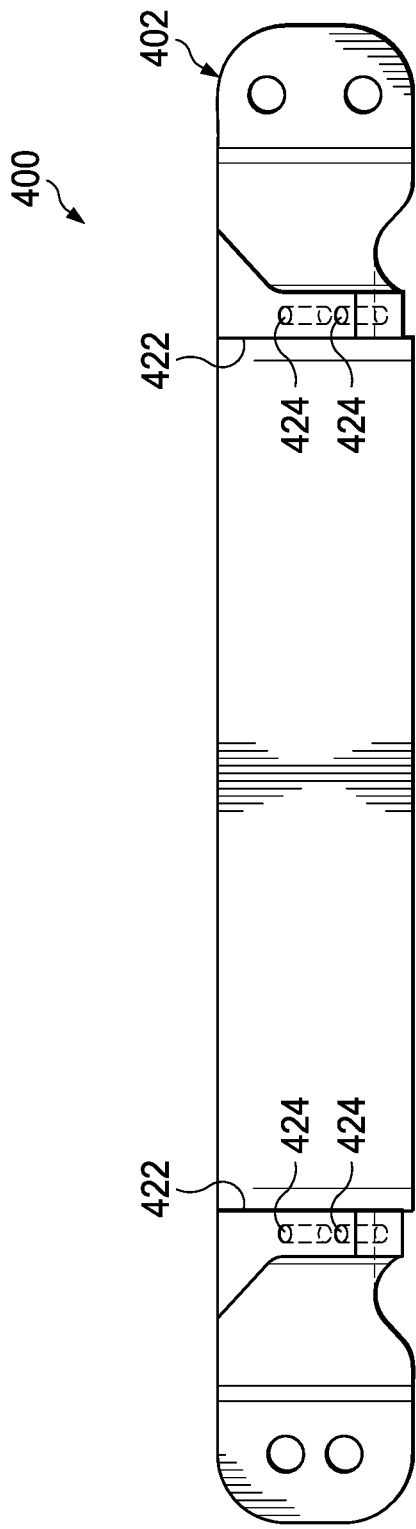

FIGS. $6_A$, 6B, and 6C are front, perspective views illustrating the adapter shown in FIGS. 2 and 3 in connection with various weapons systems;

FIG. 7 is a bottom, perspective view of an alternative embodiment of the presently disclosed adapter;

FIG. 8 is a side view of the adapter shown in FIG. 7;

FIG. 9 is a front view of the adapter shown in FIG. 7; and

Figure 10:
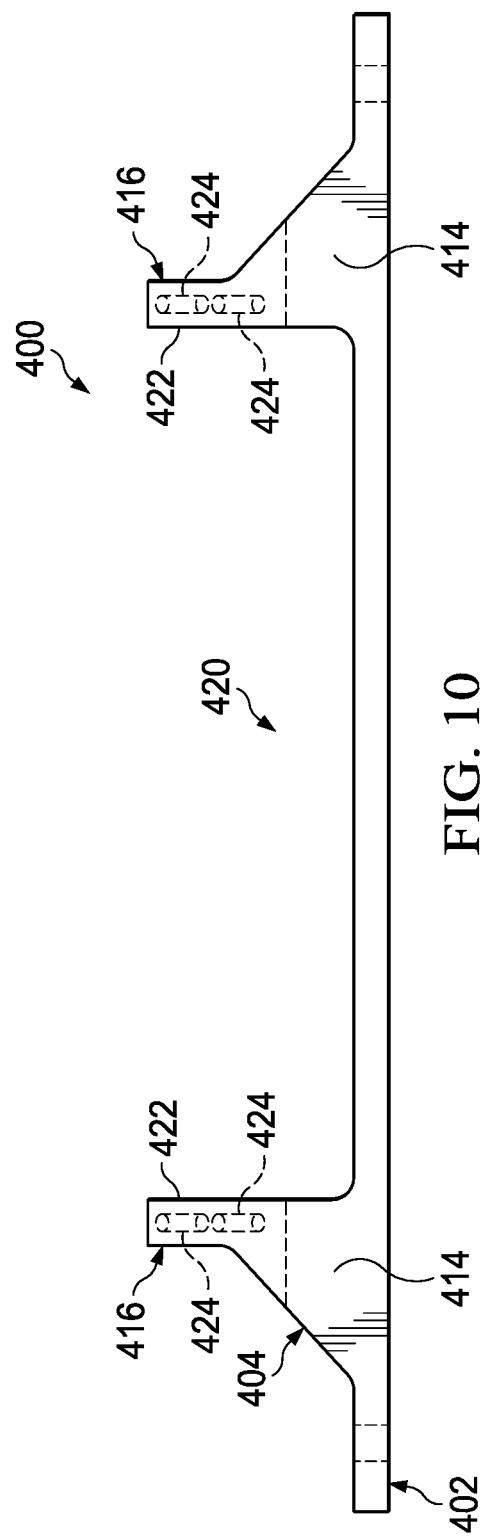

FIG. 10 is a bottom view of the adapter shown in FIG. 7.

DETAILED DESCRIPTION

In the following description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," etc., should be understood to describe a relative relationship between structures and/or a spatial orientation of the structures.

Various embodiments of the present disclosure will now be described in detail with reference to the figures, wherein like reference numerals identify similar or identical elements. In the figures, and in the following description, the term "aircraft" should be understood to encompass any suitable aircraft, e.g., helicopters, planes, drones, etc.

Figure 1:
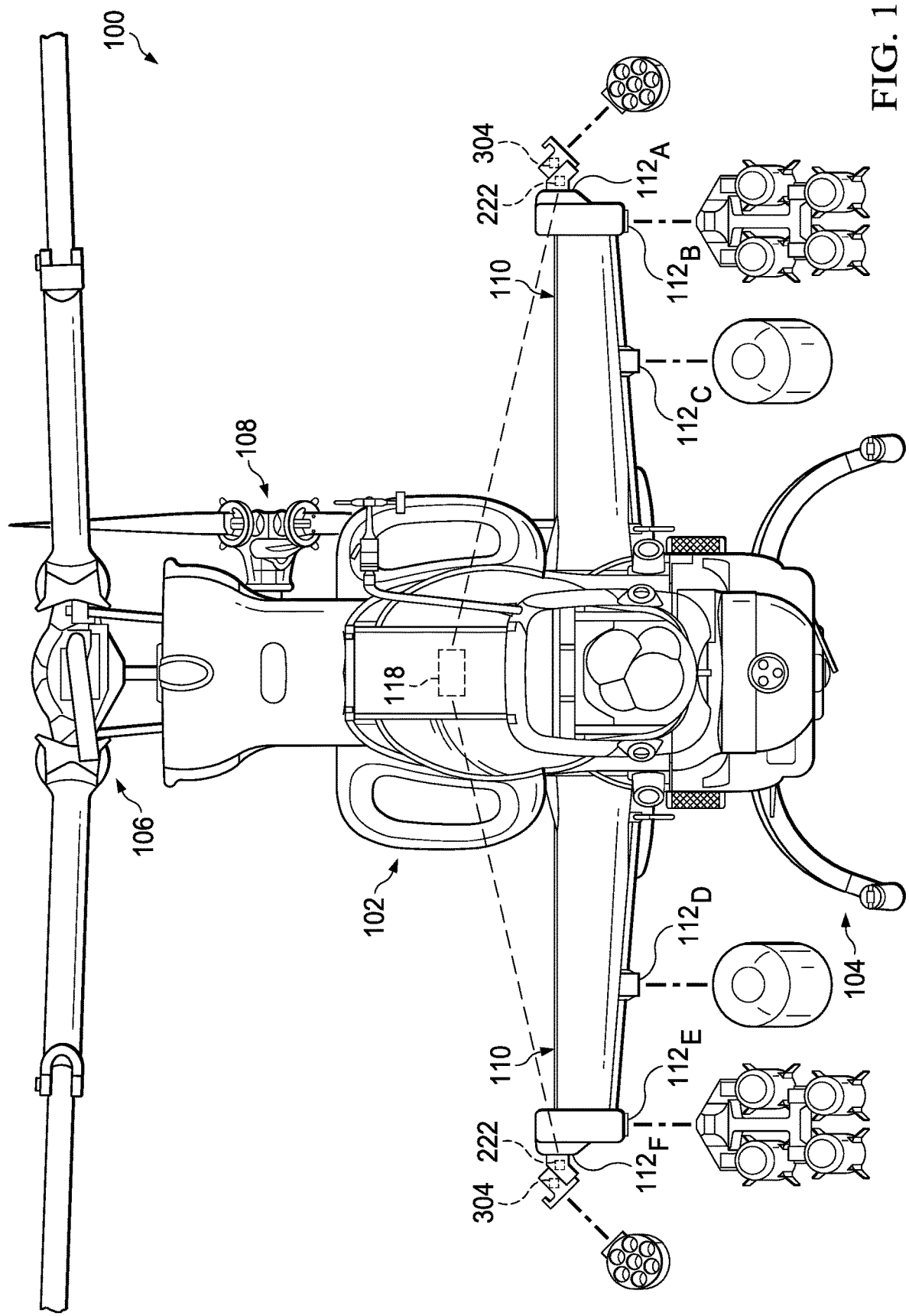
FIG. 1 is a front view of an exemplary aircraft.

Referring now to FIG. 1, an aircraft 100 is illustrated that includes a fuselage 102, landing gear 104, a main rotor system 106, a tail rotor system 108, and wings 110. The wings 110 include a plurality of stations 112 that are configured and dimensioned to carry a load, such as, for example, munitions, e.g., missile systems, auxiliary fuel tanks, etc. In the particular embodiment illustrated in FIG. 1, the aircraft 100 includes six wing stations $112_A$-$112_F$, i.e., two wingtip stations $112_A$, $112_F$, located adjacent the ends of the wings 110, and four underwing stations $112_B$-$112_E$, located beneath the wings 110. The wingtip stations $112_A$, $112_F$ define mounting surfaces $114_A$, $114_F$ (see also FIGS. 4, 5), respectively, and the underwing stations $112_B$-$112_E$ define horizontal mounting surfaces. It should be appreciated that the number of stations 112 included on the aircraft 100, and/or the particular locations of the stations 112, may be altered or varied in alternative embodiments of the aircraft 100 without departing from the scope of the present disclosure.

Figure 4:
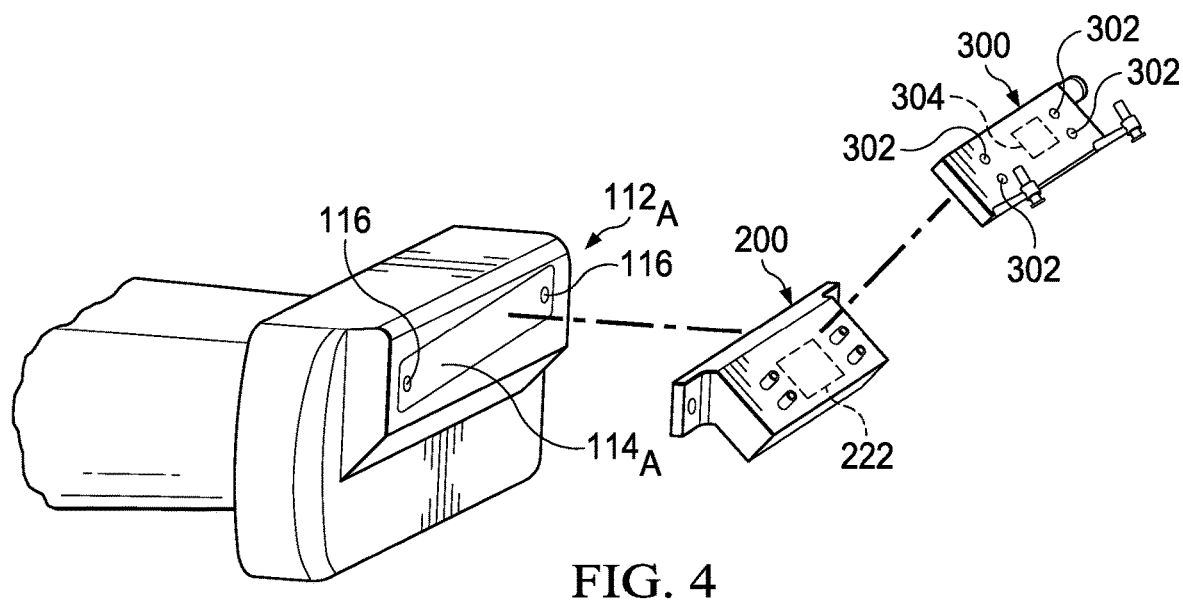
FIGS. 4 and 5 are partial, side, perspective views of the left and right wings of the aircraft, respectively, together with the adapter shown in FIGS. 2 and 3 and a weapons rack.
Figure 5:
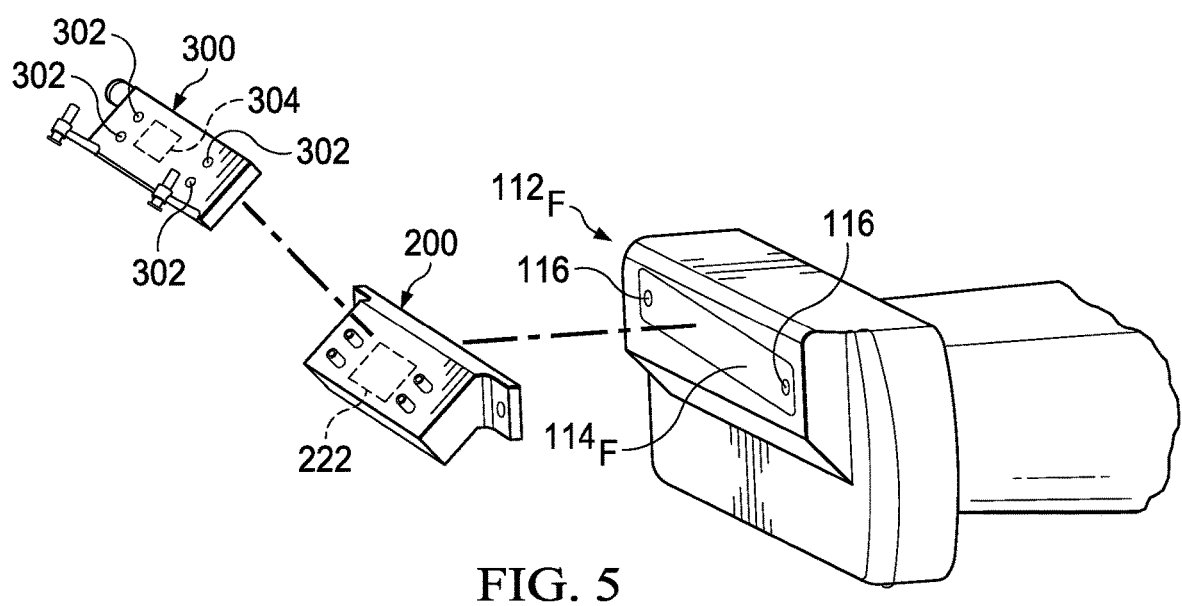

With reference now to FIGS. 2-5 as well, an adapter 200 (FIGS. 2, 3) is disclosed that provides a physical interface with the wingtip stations $112_A$, $112_F$ (FIGS. 1, 4, 5) to increase the storage and weapons capabilities of the aircraft 100. The adapter 200 is configured and dimensioned for connection to the existing mounting surfaces $114_A$, $114_F$ defined by the wingtip stations $112_A$, $112_F$, thereby eliminating any need to alter the structure of the wings 110, and is contoured accordingly to minimize drag. The adapter 200 may include, e.g., be formed from, any suitable material, such as aircraft grade aluminum, or combination of materials, and includes a backing plate 202, and a body 204 connected to the backing plate 202 that is configured and dimensioned to support a weapons rack 300 (FIGS. 4, 5).

The backing plate 202 (FIG. 2) extends along a transverse (longitudinal) axis X-X, and defines a mounting surface 206 that is configured and dimensioned for engagement with the mounting surfaces $114_A$, $114_F$ (FIGS. 1, 4, 5) defined by the wingtip stations $112_A$, $112_F$, respectively. More specifically, the backing plate 202 includes flanges 208, 210 defining a series of bolt holes 212 that are configured, dimensioned, and positioned in correspondence with bolt holes 116 (FIGS. 4, 5) formed in the mounting surfaces $114_A$, $114_F$. The bolt holes 212 are arranged into a pair of patterns, i.e., a "left wing" pattern and a "right wing" pattern, to permit use with both wingtip stations $112_A$, $112_F$, thereby obviating the need for separate "left wing" and "right wing" adapters. As seen in FIGS. 4 and 5, when attached to the left wingtip station $112_A$, bolt holes $212_L$ align with bolt holes $116_A$, and when attached to the right wingtip station $112_F$, bolt holes $212_R$ align with bolt holes $116_F$.

As best seen in FIG. 2, the bolt holes $212_L$ are aligned along an axis designated $Y_2$, and the bolt holes $212_R$ are aligned along an axis designated $Y_1$. Axes $Y_1$, $Y_2$ subtend angles $\alpha_1$, $\alpha_2$ with the axis X-X defined by the backing plate 202, respectively, which are the angles at which the weapons systems secured to the adapter 200 will be fired. The particular locations of the bolt holes $212_L$, $212_R$ can be varied to customize the firing angles $\alpha_1$, $\alpha_2$ of the weapons systems secured to the adapter 200. For example, by relocating the bolt holes $212_L$, $212_R$ the angles $\alpha_1$, $\alpha_2$ can be increased such that to achieve a more downward trajectory. In alternative embodiment, more than two bolt holes (more than holes $212_R$ and $212_L$) are contemplated and can be similarly utilized to increase the number of available fixed angles provided by the backing plate 202.

In the particular embodiment illustrated in FIG. 2, the bolt holes $212_L$, $212_R$ are positioned such that angles $\alpha_1$ and angle $\alpha_2$ are each +5°. In alternate embodiments, however, the bolt holes $212_L$, $212_R$ may be positioned to achieve any desired values for angles $\alpha_1$, $\alpha_2$, e.g., within the range of 0° to +25°, and may define unequal values so as to achieve different firing angles for the weapons systems positioned on the left and right wingtip stations $112_A$, $112_F$.

Figure 6A:
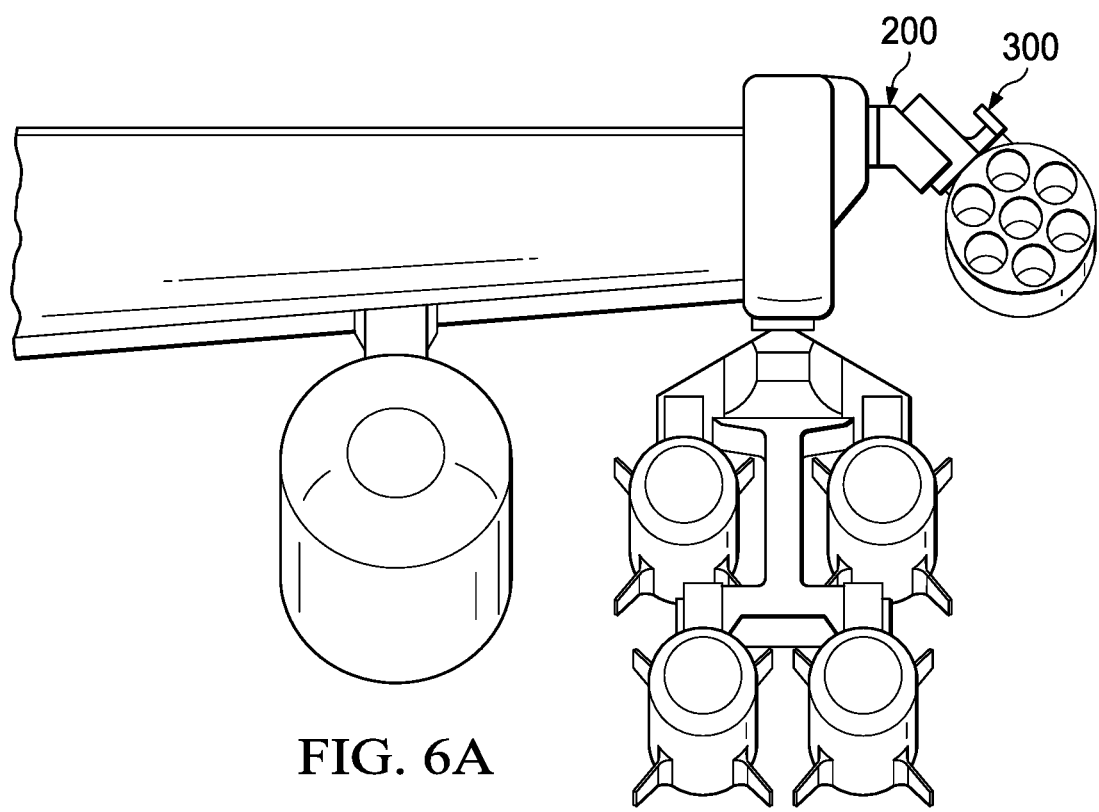
Figure 6B:
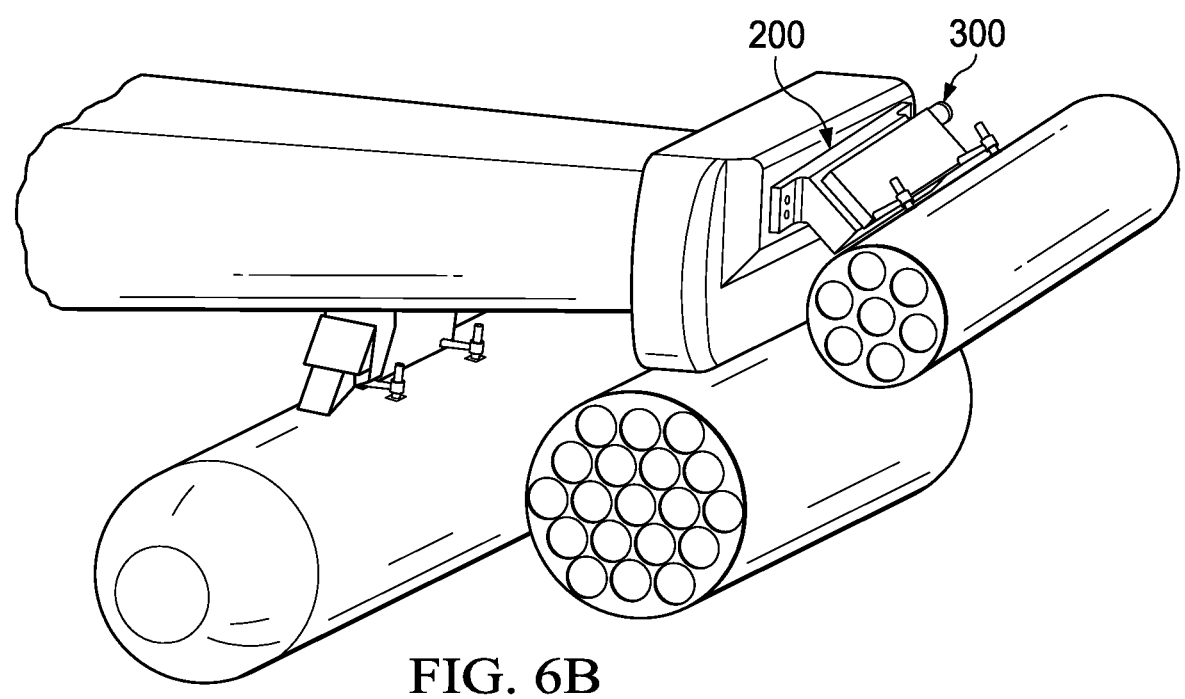
Figure 6C:
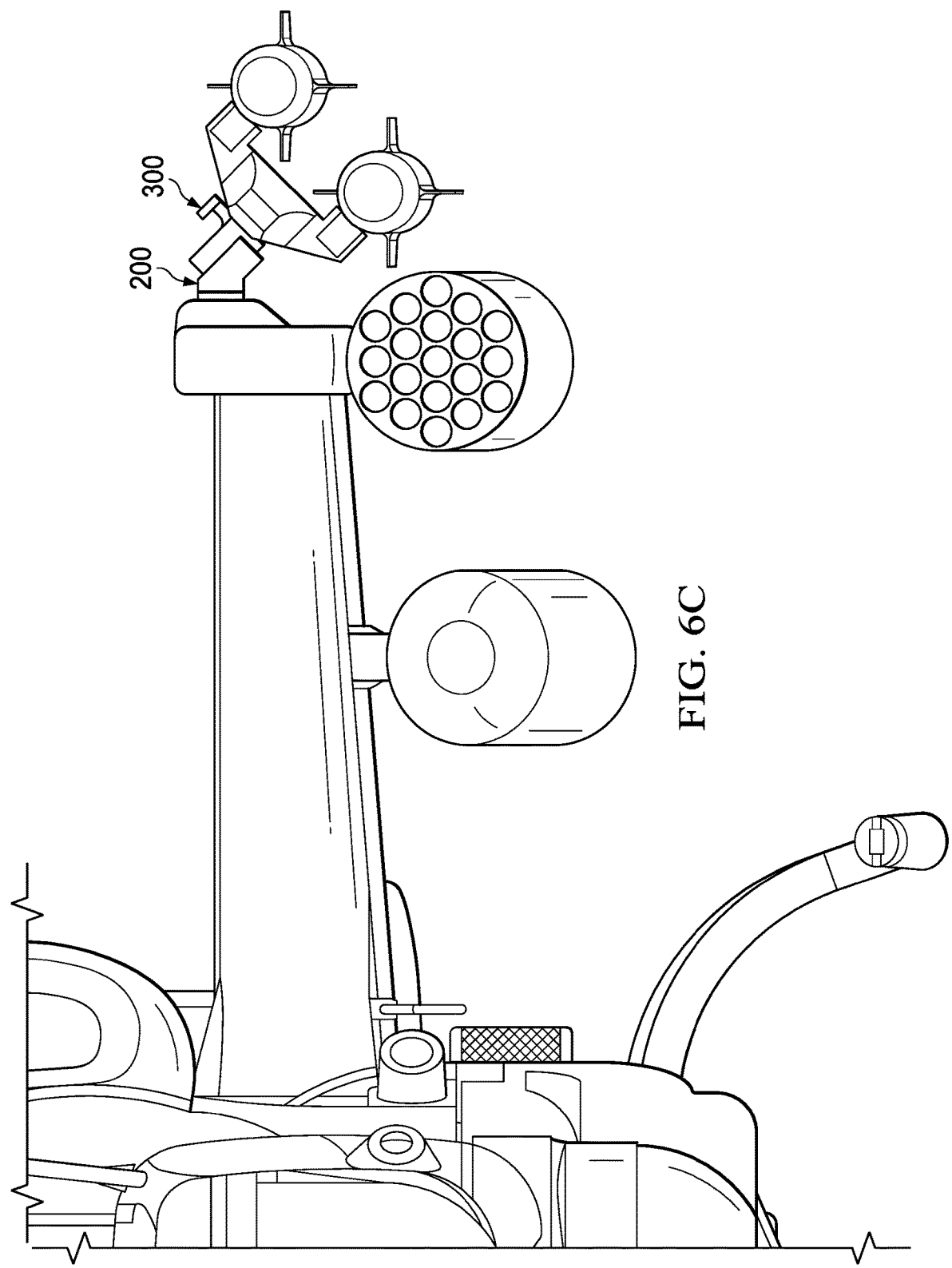

The adapter body 204 includes a base 214 (FIG. 3) that extends from the backing plate 202 along an axis X that is normal to the wingtip mounting surfaces $114_A$, $114_F$ (FIGS. 1, 4, 5), and a support member 216 that extends from the base 214 along an axis Y. In the particular embodiment of the adapter seen in FIGS. 2-5, the axes X, Y subtend an angle $\beta$ of 45° to allow for particular spacing between the wings 110 and the weapons system connected to the adapter 200, proper lateral and vertical spacing from the adjacent stations $112_B$, $112_E$ (FIG. 1), and bending loads and moments that are within tolerable limits. The angle $\beta$ thus increases the lateral spacing between the weapons systems connectable to the adapter 200 located at the wingtip stations $112_A$, $112_F$ (FIGS. 1, 4, 5), and the weapons systems located at the adjacent underwing stations $112_B$, $112_E$, respectively. This increased clearance allows for variation in the weapons systems locatable at the wingtip stations $112_A$, $112_F$, thereby increasing the weapons capability of the aircraft 100. By way of example, several variations on the weapons capabilities of the aircraft 100 facilitated by the adapter 200 are shown in FIG. 6.

In alternative embodiments of the present disclosure, dependent upon the intended utility of the adapter 200, e.g., the munitions system mounted to the adapter 200, the structure of the aircraft 100, the requirements of the particular mission in which the aircraft 100 is employed, etc., the configuration and dimensions of the base 214 and the support member 216 may be altered to achieve any desired angle $\beta$ and to support any desired weapons system.

As best seen in FIGS. 2 and 3, the support member 216 defines bolt holes 218 that are configured and dimensioned in correspondence with bolt holes 302 (FIGS. 4, 5) defined by the weapons rack 300. In one embodiment, e.g., the embodiment illustrated in FIGS. 2 and 3 for example, the bolt holes 218 extend through spacers 220, which allow for increased lateral separation between the adapter 200 and the weapons rack 300. An embodiment devoid of the spacers 220, however, would also be within the scope of the present disclosure.

It is envisioned that the support member 216 may include a series of bolt holes 218 having various configurations and located in various positions to facilitate use with a variety of weapons racks 300 to further increase the utility of the adapter 200, and thus, the weapons capability of the aircraft 100. Additionally, or alternatively, it is envisioned that the support member 216 may be configured and dimensioned for connection to an additional, smaller auxiliary fuel tank, to further increase the range of the aircraft 100.

With reference now to FIGS. 1-5, use of the adapter 200 will be described. As discussed above, the adapter 200 extends the capabilities of the aircraft 100 by allowing various weapons systems to be positioned in a plurality of locations. For example, through use of the adapter 200, a known AGM system, which would typically be mounted to one of the underwing stations $112_B$-$112_E$ in the vertical orientation seen in FIG. 1, can be mounted to one of the wingtip stations $112_A$, $112_F$ via the weapons rack 300 (FIGS. 4, 5), which, as mentioned above, are typically designed to carry AAM systems only. This added flexibility in weapons system location allows for variability and customization in the setup of the aircraft 100. For example, the range of the aircraft 100 may be increased by carrying additional fuel tanks at one or more of the underwing stations $112_B$-$112_E$, i.e., in place of AGM systems, without sacrificing weapons capability. In such instances, the AGM system(s), which might otherwise have to be omitted, can simply be relocated to the wingtip stations $112_A$, $112_F$ using the adapter 200 to maintain that weapons capability of the aircraft 100 in spite of the extra fuel load. It is conceivable, therefore, that the aircraft 100 may carry auxiliary fuel tanks in one or more of the underwing stations $112_B$-$112_E$, an AAM system on the wingtip station $112_A$, and an AGM system on the wingtip station $112_F$.

As discussed above, in known aircraft, the wingtip stations $112_A$, $112_F$ are typically designed to accommodate a specific armament, e.g., an AAM system loaded with unguided missiles. Consequently, the electronics included in the wingtip stations $112_A$, $112_F$ are generally single purpose, and thus, incompatible with varied weaponry, e.g., an AGM system, or guided missiles. To facilitate use with a variety of weapons systems, however, it is envisioned that the adapter 200 may include an emulator, signal conversion device, or other programmable logic circuit 222 that will allow for communication between a launch controller 304 for the weapons systems, e.g., included on the weapons rack 300 in the illustrated embodiment, and a control/firing system 118 (FIG. 1) of the aircraft 100.

With reference now to FIGS. 7-10, an alternative embodiment of the adapter will be described, which is identified by the reference character 400. The adapter 400 is identical to the adapter 200 (FIGS. 2, 3) described above but for the distinctions discussed below. Accordingly, in the interest of brevity, the adapter 400 will only be discussed in detail to the extent necessary to identify any differences in structure and/or function.

The adapter 400 includes a backing plate 402, and a body 404 having a base 414 and a support member 416. In contrast to the adapter 200 (FIGS. 2, 3), the adapter 400 incorporates a more skeletonized, forked design. Specifically, as seen in FIGS. 7 and 10, the support member 416 includes a channel 420 defining support posts 422 with bolt holes 424 that are configured and dimensioned in correspondence with the bolt holes 302 (FIGS. 4, 5) defined by the weapons rack 300. Incorporation of the channel 420 allows for the removal of a significant amount of material from the adapter 400, and thus, a reduction in overall weight, which allows for an increase in the weight of the weaponry that can be carried by the aircraft 100 (FIG. 1) while remaining within acceptable load limits. To further reduce the weight of the adapter 400, it is envisioned that the backing plate 402 and/or the body 404 may include hollow sections, e.g., in the support posts 422.

In some embodiments, the aircraft 100 can comprise a Bell Helicopter AH-1Z Viper helicopter. In some embodiments, the adapters 200, 400 can comprise bolt patterns configured to accommodate a bolt pattern of an LAU-7 missile launcher or an air-to-ground LAU-68 rocket pod. In some cases, the weapons can comprise AIM-9 Sidewinder AAMs, AGM-114 Hellfire air-to-ground missiles, and/or any other suitable weapon. In some embodiments, the weapons rack can comprise a BRU-59 bomb rack.

Persons skilled in the art will understand that the various embodiments of the disclosure described herein, and shown in the accompanying figures, constitute non-limiting examples of the present disclosure, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure, and will appreciate further features and advantages of the presently disclosed subject matter based on the description provided. Variations, combinations, and/or modifications to any of the embodiments and/or features of the embodiments described herein within the abilities of a person having ordinary skill in the art are also within the scope of the disclosure, as are alternative embodiments that may result from combining, integrating, and/or omitting features from any of the disclosed embodiments.

Where numerical ranges or limitations are expressly stated, such express ranges or limitations should be understood to include iterative ranges or limitations of like magnitude falling within the expressly stated ranges or limitations, e.g., from about 1 to about 10 includes 2, 3, 4, etc., and greater than 0.10 includes 0.11, 0.12, 0.13, etc. Additionally, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers, in accordance with the above discussion, is also specifically disclosed.

Use of the term "optionally" with respect to any element of a claim means that the element is required, or alternatively, the element is not required, both alternatives being within the scope of the claim. Use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

Each and every claim is incorporated as further disclosure into the specification, and the claims are embodiments of the present disclosure. Also, the phrases "at least one of A, B, and C" and "A and/or B and/or C" should each be interpreted to include only A, only B, only C, or any combination of A, B, and C.

What is claimed is:

1. An adapter for use with an aircraft including wingtip stations defining mounting surfaces, the adapter being configured and dimensioned for connection to the wingtip stations to facilitate connection of a weapons rack to the aircraft, the adapter comprising:
   a backing plate configured and dimensioned in correspondence with the mounting surfaces defined by the wingtip stations; and
   a body connected to the backing plate configured and dimensioned to support the weapons rack, the body including a base extending outwardly from the backing plate along a first axis, and a support member extending outwardly from the base along a second axis, the first and second axes defining an angle therebetween;
   wherein the wingtip station is disposed at an outboard end of a wing and wherein at least a portion of the backing plate is located vertically higher than the wing.

2. The adapter of claim 1, wherein the backing plate define a series of bolt holes configured and positioned in correspondence with bolt holes formed in mounting surfaces defined by the wingtip stations.

3. The adapter of claim 2, wherein the bolt holes defined by the backing plate are arranged into a left wing pattern and a right wing pattern such that the adapter is mountable to either wing of the aircraft.

4. The adapter of claim 1, wherein the angle defined between the first and second axes is 45°.

5. The adapter of claim 1, wherein the support member defines bolt holes configured and positioned in correspondence with bolt holes formed in the weapons rack.

6. The adapter of claim 1, wherein the support member includes a channel defining support posts.

7. The adapter of claim 6, wherein the support posts define bolt holes configured and positioned in correspondence with bolt holes formed in the weapons rack.

8. An adapter configured and dimensioned for engagement with an aircraft wingtip station and a weapons rack to facilitate connection of the weapons rack to the wingtip station, the adapter comprising:
   a backing plate; and
   a body connected to the backing plate configured and dimensioned to support the weapons rack, the body including a base extending substantially horizontally outwardly from the backing plate along a substantially horizontal first axis, and a support member extending outwardly from the base along a second axis, the first and second axes defining an angle therebetween;
   wherein the wingtip station is disposed at an outboard end of a wing, and wherein at least a portion of the backing plate is located vertically higher than the wing.

9. The adapter of claim 8, wherein the backing plate is formed to be complementary to a feature or profile of the wingtip station.

10. The adapter of claim 9, wherein the backing plate includes a series of bolt holes positioned for alignment with bolt holes formed in the wingtip stations.

11. The adapter of claim 10, wherein the bolt holes of the backing plate are arranged into a first pattern and a second, different pattern.

12. The adapter of claim 11, wherein the configuration of the first pattern facilitates connection of the adapter to a first wing of the aircraft, and the configuration of the second pattern facilitates connection of the adapter to a second wing of the aircraft.

13. The adapter of claim 8, wherein the angle defined between the first and second axes is 45°.

14. The adapter of claim 8, wherein the support member defines bolt holes configured and positioned in correspondence with bolt holes formed in the weapons rack.

15. The adapter of claim 8, wherein the support member includes a channel defining support posts, the support posts defining bolt holes configured and positioned in correspondence with bolt holes formed in the weapons rack.

16. An aircraft wingtip adapter comprising:
   a backing plate configured and dimensioned for engagement with a wingtip station on a wing of an aircraft;
   a body extending initially from the backing plate and subsequently extending downward at an angle relative to the initially extension, the backing plate configured and dimensioned to support a weapons rack;

wherein the wingtip station is disposed at an outboard end of the wing and wherein at least a portion of the backing plate is located vertically higher than the wing.

17. The aircraft wingtip adapter of claim 16, wherein the backing plate define a series of bolt holes configured and positioned in correspondence with bolt holes formed in the wingtip stations.

18. The aircraft wingtip adapter of claim 17, wherein the bolt holes defined by the backing plate are arranged into a left wing pattern and a right wing pattern such that the adapter is mountable to either wing of the aircraft.

19. The aircraft wingtip adapter of claim 16, wherein the angle is 45°.

* * * * *